Patented Dec. 25, 1951

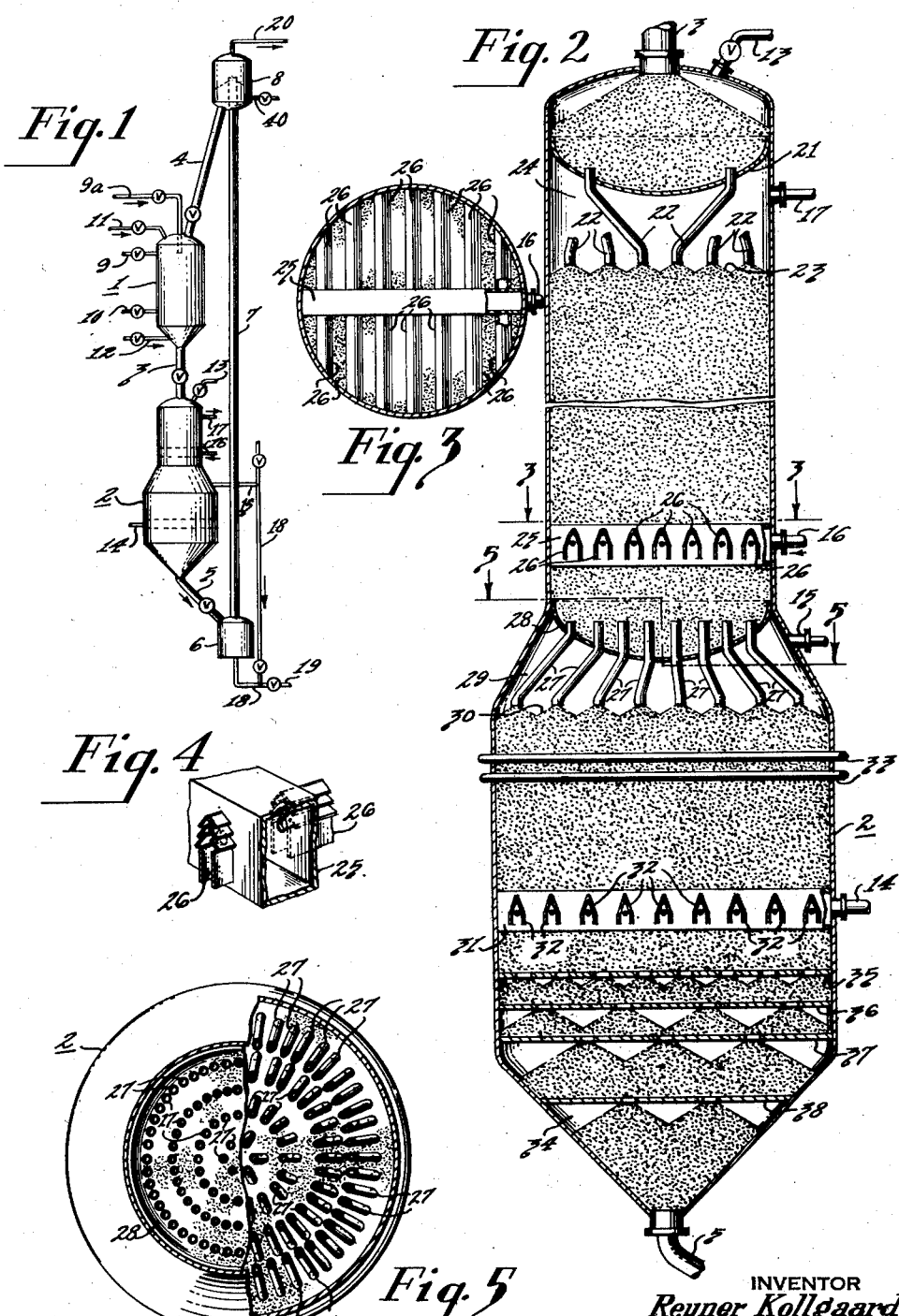

2,579,834

UNITED STATES PATENT OFFICE 2,579,834

MOVING CATALYST CONVERSION SYSTEM

Reyner Kollgaard, Media, Pa., assignor to Houdry Process Corporation, Wilmington, Del., a corporation of Delaware Application May 21, 1949, Serial No. 94,584

8 Claims. (Cl. 196—52)

The present invention relates to hydrocarbon conversion systems employing a circulating body of solid contact mass. The novel features of the invention have their most important practical application in conversion systems of the type in which a solid contact mass, such as a catalyst, is continuously moved through a reaction zone, then through a regeneration zone to burn off combustible deposit accumulated in the reaction zone, the regenerated catalyst being repeatedly returned to the reaction zone for further use therein.

Systems of the type above described are widely used in processes for catalytic cracking of hydrocarbons, such as petroleum oils, particularly for the production of desired liquid fuels, chiefly motor fuels, such as gasoline. In a typical process, a hydrocarbon oil heavier than gasoline, such as a gas oil, in vapor or mixed phase, is brought into contact with solid particles of the cracking catalyst at selected conditions of rate and temperature at about 800° F. or above, to effect conversion of a substantial part of the charge stock to desired lighter normally liquid hydrocarbons. In common use as catalysts for the purpose are natural and synthetic siliceous adsorptive masses, such as acid-activated sub-bentonite clays and dried gels comprising silica and alumina. Similar systems and processes are often used in the treatment of gasoline and naphtha fractions to obtain improvements in the quality thereof, such as upgrading of the octane rating; these treatments are sometimes referred to as "catalytic treating" or "reforming."

In these and related hydrocarbon conversion processes, a minor portion of the hydrocarbons charged to the process are converted to "coke," a combustible carbonaceous and/or hydrocarbonaceous material which becomes deposited in the catalyst, reducing the efficiency of the catalyst. For this reason the systems are so arranged and designed that the catalyst remains in contact with the hydrocarbons during a predetermined period of "on-stream" operation, the coke-contaminated catalyst being discharged from the reactor and transferred to a regenerating kiln, in which the catalyst is contacted with air or other oxygen containing gas to burn off substantially all or a desired portion of the coke content.

The burning of the coke deposit during regeneration of the catalyst is exothermic, resulting in elevation of the temperature of the catalyst mass. Means are therefore generally provided for controlling the temperature during regeneration to avoid excessive temperatures, as above about 1150° F., that may be injurious to the catalyst. Products of combustion are removed from the kiln as flue gas, and the regenerated catalyst is returned to the reactor for further contact with hydrocarbons to be processed thereby.

In systems where the catalyst is moved downwardly, by gravity or otherwise, through the reactor and through the regenerating kiln, means are provided for returning the catalyst to a higher level for repeated circulation. In many known commercial installations this has been accomplished by means of mechanical elevators; more recent arrangements depend upon the use of a gaseous lifting medium for this purpose. The construction and operation of the present invention is particularly designed for use in the latter type of arrangement, since the advantages of the novel kiln design, constituting an important feature of the invention, can be beneficially utilized to the fullest extent in association with gaseous elevation of the catalyst. The novel kiln and other aspects of the invention may be used with certain advantages in other systems, such as those employing mechanical elevators.

In accordance with the preferred embodiment of the invention, regeneration of the catalyst is conducted under countercurrent flow conditions, the regenerating gas passing upwardly through descending compact beds of catalyst in several consecutive zones of the kiln. The regenerating gas is separately admitted at the bottom of each of said zones and the resulting gaseous combustion products are respectively and separately discharged at the top of each said zones, suitable provision being made for disengagement of these combustion gases from the catalyst. The kiln is so designed and operated that a comparatively low pressure drop per unit of depth is obtained by the gases passing through the bed of catalyst in the lowermost zone of the kiln and a comparatively high pressure drop per unit of depth through the bed of catalyst in the uppermost regenerating zone, with resulting advantages hereinafter described. The flue gas discharged at the top of the lowermost zone is employed as the lifting medium for elevating the catalyst to desired height, from which the catalyst can be ultimately fed by gravity to the top of a hydrocarbon conversion reactor.

By operating the kiln in the manner above indicated with a comparatively low total pressure drop in the lowermost zone of the kiln and utilizing only the combustion products from the lower zone as the lift gas, the desired pressure for efficient elevation of the catalyst is readily provided, precluding the necessity for expensive compression of the lift gas. In addition, since the major portion of the most readily combustible or distillable hydrocarbonaceous and other components will be removed during the earlier stages of combustion in the upper zone of the kiln, the flue gas provided from regeneration in the lowermost zone of the kiln will be relatively free of deleterious vapors such as sulfur- and nitrogen-containing gases detrimental to catalyst activity. Moreover, because of the low pressure drop in the bottom zone of the kiln, a relatively high average pressure and relatively high discharge pressure is maintained for any given air inlet pressure. A higher pressure of oxygen is thereby provided in the zone where it is most beneficial, to facilitate burning of the more difficultly removable residual carbon.

The comparatively lower pressure drop through the lowermost regenerating zone is obtained by providing a bed of relatively greater cross-section in that zone, while a bed of comparatively small cross-section is provided in the upper zone. For the same volume of catalyst and at the same air rate, it will be seen, that the pressure drop through the wider bed will be reduced, while the pressure drop through the narrower bed will be increased. This arrangement offers several additional advantages in practical operation in accordance with the invention. By reducing the pressure drop in the lower portion of the kiln the flue gas discharged as combustion products from such lower zone will be at a correspondingly higher pressure for desired use as a lifting medium for the catalyst. With a relatively high pressure drop through the uppermost zone of the kiln, the pressure resulting at the discharge outlet of flue gas near the top of the kiln is correspondingly reduced. Under such conditions of low pressure at the top of the kiln, continuous smooth circulation of catalyst can be maintained through a relatively short conduit between an immediately preceding vessel (such as reactor) and the kiln, even though that preceding vessel is permitted to drop to substantially atmospheric pressure. Such arrangement has important advantages, for instance, where the flow of hydrocarbons to a reactor immediately preceding the kiln is being by-passed, as may be necessary in connection with starting up and shutting down the operation of the system, or because of abnormal pressure conditions in that part of the system handling hydrocarbon charge or hydrocarbon effluent.

The problem of providing for flow of catalyst against back-pressure from the kiln is particularly important in arrangements wherein the reactor is located above a kiln in which there is a substantial gas pressure proximate the top of the kiln, and catalyst normally flows from the reactor to the kiln through an enclosing conduit which can operate as a seal leg. In accordance with the present invention, the communicating conduit between the reactor and the kiln is made of sufficient length to provide for a pressure drop therethrough to balance the highest gauge pressure prevailing at the top of the kiln, such that upward flow of gas in the conduit will not materially hinder smooth and uninterrupted downward flow of the column of catalyst through the conduit, as will hereinafter be more fully described. It will therefore be seen, that this aspect of the invention is not necessarily limited in its applicability to the preferred kiln design described.

Other advantages of the invention flowing from the novel arrangement and operation and the improved kiln design will be apparent from the description which follows, read in connection with the accompanying drawings illustrating a preferred form of apparatus adapted for the practice of the invention.

In the drawings, Figure 1 is a schematic process flow diagram of a preferred arrangement of a hydrocarbon conversion system to which the invention is applicable; Figure 2 is a vertical section through the novel kiln; Figure 3 is a horizontal cross-section on the line 3—3 of Figure 2; Figure 4 is a partial isometric view showing in enlarged form the arrangement of a gas inlet system to the kiln; Figure 5 is a horizontal cross-section taken on a line 5—5 of Figure 2.

Referring now more particularly to Figure 1; there is shown an assembly in superimposed relation comprising a reactor 1 and a kiln 2, interconnected for flow of catalyst therebetween by a conduit 3. Catalyst is fed to the reactor through a conduit 4, and passes downwardly as a compact flowing mass through the reactor 1, interconnecting conduit 3 and kiln 2, being discharged from the bottom of the kiln through a conduit 5 into a lift hopper 6, in which a bed of catalyst is accumulated. From the lift hopper 6, catalyst from the accumulated bed is pneumatically transferred by the impelling force of a gaseous medium into the lift conduit 7, and is conveyed through the conduit by said gaseous medium to a disengaging hopper 8, located at an elevation above the top of the reactor 1. Slide valves are provided in the conduits 3, 4, and 5 so that flow of catalyst can be shut off at these points in connection with filling or emptying the system, or if required in certain emergencies.

Hydrocarbon charge to be processed is brought into the reactor 1 by means of one or more lines indicated at 9 and 9a, and conversion products are discharged from the reactor by means of a line indicated at 10. In the illustrated embodiment, the hydrocarbons will flow concurrently with the descending bed of catalyst. In certain instances, if desired, the arrangement may be reversed for countercurrent operation, by admitting hydrocarbons through line 10. In concurrent operation, hydrocarbon charge in vaporized form may be introduced through line 9, another portion of the charge being fed in liquid or mixed phase through line 9a. Means are also provided as indicated at 11 for introduction of steam or desired inert gas that may be required as seal gas.

At a level in the reactor below the discharge line 10, means are provided, as indicated at 12, for the introduction of a purge gas to remove occluded volatile materials from the catalyst and also operating normally as a seal gas to prevent flow of incompatible gases between the reactor and the kiln. Steam or inert gas may also be introduced into the top of the kiln through a valve-controlled line 13; which ordinarily will be closed during normal operation.

Regenerating gas is introduced to the lower zone of the kiln through a line 14 and withdrawn together with combustion products from the top of that zone through a line 15. Regenerating gas employed in the upper zone of the kiln is introduced through a line 16 and combustion products withdrawn from the top of the catalyst bed in that zone by means of a line 17. The flue gas discharged through line 17 may be sent to waste or utilized in other portions of the system as desired. The flue gases discharged through the line 15, however, are brought by means of a connecting line 18 and through a jet or other gas introduction system into the catalyst lift hopper 6, for use as lift gas. An auxiliary line 19 also communicates with connecting line 18 for use during starting-up of the operation. The catalyst elevated by the flue gas and transported through the lift conduit 7 is brought into the disengaging hopper 8, where, as a result of decrease in velocity due to the wider cross-section there provided, the catalyst settles out from the influence of the transporting gas and accumulates in the bottom of hopper 8 as a compact bed, the separated gas passing off overhead as by means of a line 20. From the bottom of the bed formed in the hopper 8, the catalyst is returned by gravity through the conduit 4 to the top of the reactor 1, for repetition of the described cycle.

Details of construction of the novel kiln are more particularly illustrated in Figure 2. The catalyst introduced into the kiln through the conduit 3 is supported on a tube sheet 21 and discharged substantially uniformly over the cross-section of the kiln by means of downcomers 22, to form a compact bed of catalyst in the upper regenerating zone of the kiln. There is thereby formed between the bottom surfaces of the tube sheet 21 and the upper surface 23 of the catalyst bed, a plenum 24. The plenum communicates with the discharge line 17, through which vapors disengaged from the bed at the surface 23 are discharged.

The regenerating gas introduced into the upper zone of the kiln through line 16 enters a distributing manifold as indicated at 25 and is distributed substantially uniformly over the cross section of the catalyst bed through louvered and open bottomed channels 26, branching from the manifold (see particularly Figures 3 and 4).

Below the level of the gas inlet system comprising the manifold 25, the catalyst in its descent passes from the upper zone of the kiln to the lower zone through downcomers 27, which are suitably arranged to uniformly spread the narrow bed of catalyst in said upper zone over the wider cross section provided in the lower zone of the kiln. Downcomers 27 are supported from a tube sheet 28, and are of suitable length to provide a plenum 29 between the bottom surface of the tube sheet 28 and the upper surface 30 of the catalyst bed formed in the lower zone of the kiln. The line 15 communicates with plenum 29 for withdrawal of combustion gases disengaged from the surface 30 of the catalyst bed in such lower zone. A suitable arrangement of downcomers 27 is represented in Figure 5, being shown in the form of concentric circles. Other arrangements of downcomers for providing uniform catalyst withdrawal and distribution may be employed, depending particularly upon the configuration of the cross-section of the kiln.

Regenerating gas introduced into the lower section of the kiln through line 14 enters a manifold 31, having open bottomed channels branching therefrom as shown at 32. These channel members may be arranged similarly to the channel members 26 in the upper section of the kiln, and as illustrated in Figures 3 and 4. If desired, the channel member 32 may also be louvered in the same manner as the channel members 26.

For control of temperature in the lower section of the kiln, cooling coils are provided as illustrated at 33, through which a heat exchange medium such as water or molten salt may be circulated in indirect heat exchange with the catalyst.

It will be understood that cooling coils may also be provided at other suitable locations in the kiln in addition to or instead of those in the lower zone of the kiln, depending upon cooling requirements in particular process designs.

Uniform withdrawal of catalyst from the bottom of the kiln is obtained in the illustrated arrangement by converging the circular wall of the kiln downwardly as indicated at 34, and by providing spaced draw off plates as illustrated at 35, 36, 37 and 38. Each of said plates has spaced perforations arranged therein in the form of concentric circles, the number of perforations decreasing in that order from the upper to the lowermost plate. As shown, the lowermost plate 38 may have a single circle of perforations.

In operation of the illustrated arrangement, the flue gas discharged through line 15 is at sufficient pressure and adequate in amount for smooth and uniform elevation of the quantity of catalyst desired to be circulated in the system. For the best economical operation of the system, the regenerating gas admitted through line 14 and the amount of coke to be burned in the lower section of the kiln should be so related that the oxygen content of the discharged flue gas is reduced to a practical minimum, the oxygen being utilized to fullest practical extent to burn the desired amount of coke from the catalyst. Since this zone of the kiln is also operated under counter current flow conditions, the most complete utilization of the oxygen content of the regenerating gas is favored, thereby resulting in flue gas low in oxygen and avoiding or minimizing the possibility of ignition of any residual coke in the hopper 6 and lift conduit 7.

The application of the invention in connection with a particular operation, by way of example, will now be described. Considering a system designed to circulate 150 tons of an acid-activated clay catalyst per hour, the catalyst having a density of about 40 to 50 lbs. per cubic foot, and the cracking of a stock in the reactor 1 which deposits about 2500–2550 pounds of coke on the catalyst per hour. The catalyst is admitted to the kiln at approximately its discharge temperature from the reactor, say at about 860° F. Regenerating gas may be admitted through line 16 to the upper zone of the kiln under a pressure just above 6 pounds per square inch guage, say at 6.1 pounds, and at the temperature obtained on compression of atmospheric air; that is at about 150° F. To effect the desired regeneration, 30,000 to 31,000 pounds of air per hour will be admitted to the kiln, divided about equally between the two zones. A bed depth of sufficient height is provided in the upper zone of the kiln to result in a pressure drop of about 3 lbs. or slightly less; for instance, the combustion gases discharged through line 17 may be at about 3.2 lbs. per square inch. Under these conditions the maximum temperature within the upper zone of the kiln may be maintained at a safe margin, without requiring additional cooling means.

The descending body of catalyst coming in contact with the cool air in the vicinity of the upper air inlet channels 26, will be reduced in temperature so as to be admitted to the lower zone of the kiln at approximately 950° F., or somewhat less. Although approximately the same quantity of air is to be admitted to the lower zone of the kiln in the illustrated operation as in the upper zone, such air admitted through the inlet line 14 at higher pressure than that employed in the upper zone, say at about 7 lbs. per square inch. Because of the expanded width of the bed in the lower zone of the kiln, comparatively small pressure drop will be had; for instance, the combustion gases may be removed through line 15, at 6 lbs. per square in. The pressure of the gas introduced through line 16 being at or only slightly above the pressure of the flue gas discharged through line 15, the two zones of the kiln are maintained substantially separate without significant flow of gas between the upper and lower zones of the kiln. Reduction of temperature in the lower zone of the kiln, if required for control of temperature, may be accomplished by removal of heat by indirect heat exchange through cooling coil 33. The catalyst may thus be discharged from the kiln at any desired temperature in the approximate range of about 900–1100° F. In the illustrated operation a discharge temperature of about 900–925° F. is maintained.

In order to maintain an efficient operation without unduly expanding the size of the kiln, the catalyst may be discharged from the kiln while still containing a small amount of residual carbon; which in the illustrated operation is at about 0.3% by weight of the catalyst.

By operating in the described manner, there is provided 17,000–18,000 pounds per hour of flue gas at 6 lbs. per square inch pressure at discharge line 15. With the necessary pressure drop through the flue gas lines and through the controls, the flue gas can be supplied to hopper 6 at 4 to 5 pounds, for use in elevation of catalyst therefrom.

The operating conditions employed in the reactor 1 may be varied over a wide range, and ordinarily will take into consideration the characteristics of the particular charge stock being treated. To carry the exemplified operation further, the conditions employed in the reactor will be based on an operation capable of producing the above-described quantity of coke. In normal operation, hydrocarbon conversion products may be discharged through line 10, in a concurrent operation, at say 6 lbs. per sq. in., which pressure will be sufficient to maintain flow of the effluent through auxiliary equipment including condensers and fractionating equipment. The vapor portion of the charge stock may be admitted to the reactor through line 9 at say 7 to 11 lbs. per sq. inch gauge, depending upon the height of the bed and the pressure drop existing through the bed. If liquid hydrocarbons are also to be charged, these will be introduced through line 9a. Seal gas, which may be steam or inert gas, and operating also as a purge gas, is admitted through line 12 at a pressure slightly above that prevailing at the level of discharge line 10, say at about 6.1 lbs. per square inch. In normal operation, a portion of the admitted seal gas will flow downwardly through leg 3 between the reactor and the kiln, thus preventing admission of flue gas from the kiln into the reactor. The seal gas entering the kiln will be discharged with combustion products through line 17. For reasons which follow, leg 3 should be of sufficient length to provide for a pressure drop therein at least equal to or only slightly short of the operating pressure at the top of the kiln. In the illustrated instance, with flue gas being discharged through line 17 at 3.2 pounds per square inch, the leg 3 should be approximately 15 feet in length to accommodate that pressure. In normal operation, a portion of the seal gas introduced through line 12 will flow downwardly in leg 3, maintaining an adequate seal between the reactor and the top of the kiln which is at a lower pressure.

It should be noted, that in the described embodiment the relation of the length of leg 3 to the existing pressure at the bottom of the reactor and the top of the kiln is such that an efficient pressure seal between the reactor and the kiln can be effectively maintained not only during normal operation, but also during interrupted operation in which the reactor pressure drops to atmospheric or higher pressure below that at the top of the kiln. The comparatively low pressure at the flue gas discharge outlet 17, has particular advantages in those instances when it is found necessary to temporarily discontinue the flow of hydrocarbons through the reactor 1, which can be easily accomplished under the described conditions without shutting down the system and without necessitating cumbersome depressuring. Thus, when the pressure at the bottom of the reactor is permitted to reach substantially atmospheric pressure as a result of discontinuing the flow of hydrocarbons through the reactor, catalyst may be continuously circulated through the reactor and kiln passing through the connecting leg 3. The difference in pressure between the top of the kiln (3.2 lbs. per square inch) and the bottom of the reactor (0 lb. per square inch) is then readily taken up by the pressure drop provided in the leg 3, by flowing only a small amount of seal gas upwardly therein, such as steam or inert gas, admitted under controlled rate through the valve in line 13.

The total pressure drop in the lift pipe 7 will depend on the height of that pipe at any given catalyst concentration and for any fixed gas velocity therethrough. For instance with a lift pipe of about 150 to 200 feet in height, and with the catalyst and flue gas flow rates of the illustrated example, there will be a total pressure drop of about 4–5.5 lbs. in the lift, resulting in a pressure of about 1 pound per square inch or less in the disengaging vessel 8. A vapor seal is maintained in the conduit 4, to prevent upward flow of hydrocarbons in the conduit; for instance by the admission of steam or inert gas through line 11.

If steam is introduced through line 11, the catalyst will be hydrated thereby with release of heat of hydration; to a considerable extent in the case of clay catalyst. In order to assure smooth uninterrupted flow of catalyst through the conduit 4, in that event, the catalyst should be introduced into the conduit 4 in at least partially hydrated condition. For this reason an inlet line is preferably provided as illustrated at 40 (Figure 1), for introduction of steam into the disengaging chamber 8.

Hydration of clay catalyst results in a significant elevation of the catalyst temperature due to the exothermic heat of hydration. The extent of this rise in temperature of the catalyst will depend upon the amount of steam that can be adsorbed thereon to saturate the catalyst therewith, which under equivalent steaming conditions is in turn dependent upon the temperature of the catalyst when subjected to hydration. In the foregoing example, the clay catalyst being discharged from the kiln at about 900 to 925° F. in substantially non-hydrated condition, about 1.2 to 1.5% by weight of steam can be adsorbed thereon with a consequent temperature elevation in the order of about 100°–110° F.

In the foregoing example it was assumed that catalyst is being circulated at the rate of 150 tons per hour and coke is deposited thereon during the cracking operation, at approximately 0.9% by weight of the catalyst. A typical cracking operation which will give this quantity of coke on the catalyst is the following: A gas oil of about 30° A. P. I. gravity is cracked over clay catayslt in mixed phase at an average reaction temperature of about 875° F., at a liquid space rate of approximately one part by weight of oil to one part catalyst per hour, and an average pressure in the reactor of 7.5 pounds per square inch gauge. With the hydrated clay catalyst entering the reactor at about 1000–1025° F. and the oil being fed to the reactor at a rate to provide a catalyst to oil weight ratio of about 4.5 to 5, the indicated average reaction temperature is obtained by introducing about 32–35% of the oil in liquid phase at about 520° F. and the remainder in vapor phase at about 825° F.

In the use of catalyst such as synthetic silica-alumina, the degree of temperature elevation due to hydration being decidedly less than in the case of clay, hydration of the catalyst in the vessel 8 will not ordinarily be practiced. Likewise, even with clay catalyst, such hydration may be omitted, if desired; in which event seal gas other than steam will ordinarily be used in conduit 4. In these cases, the catalyst may be admitted to the reactor at approximately (or somewhat below) the temperature of its discharge from the kiln. The same reaction temperatures may nevertheless be maintained in the reactor, if desired, by adjusting the temperature at which the catalyst is discharged from the kiln and/or the temperature of the hydrocarbon charge. Addition of process steam with the hydrocarbons charged to the reactor may also be utilized.

The above example of a typical operation is merely illustrative, the particular system offering wide flexibility with respect to operating conditions of both the reactor and kiln. Thus, the regeneration conditions may be varied to accommodate, within the coke-burning capacity of the kiln, the quantity of coke deposited during the cracking of any particular charge stock. In a system of fixed dimensions and suitable reactor and kiln capacity, the mass circulation rate of the catalyst may be varied over a considerable range, as from about 100 to 200 tons per hour, thereby affording flexibility in adjustment of reaction conditions as may be desired for different stocks or selected distribution of cracked products. The hydrocarbon charge may be introduced to the reactor entirely in vapor state, in which event the catalyst temperature entering the reactor need not be as high as when liquid hydrocarbons are also fed, since the heat utilized in the latter instance in vaporization of the liquid charge is not required for the wholly vaporized charge. For instance, the same average reaction temperature can be provided as in the illustrated example, 875° F., with all of the hydrocarbon charge introduced as vapor at 825° F., and the hydrated clay catalyst entering the reactor at about 840° F. Other variations in operation of the described system will be apparent to those skilled in the art.

It will be understood that the invention is not limited to systems wherein the reactor and kiln are superimposed, but may be applied with certain advantages to other arrangements such as where the reactor and kiln are located side by side and the flue gas discharged from the kiln is employed for transporting the catalyst from the bottom of the kiln or even from the bottom of the reactor, suitable provision being made to avoid admixture of incompatible gases in the system. Likewise the novel kiln design illustrated may be employed, if desired, in systems utilizing mechanical lifting means such as bucket elevators, as is the case when operating in a pressured housing.

Obviously many modifications and variations of the invention as hereinbefore set forth may be made without departing from the spirit and scope thereof and therefore only such limitations should be imposed as are indicated in the appended claims.

I claim as my invention:

1. In the operation of a hydrocarbon conversion system, the method of regenerating solid granular hydrocarbon conversion catalyst containing combustible deposit, which comprises passing such catalyst downwardly as separate laterally confined compact beds through vertically spaced consecutive combustion zones, separately admitting regenerating gas to each of said combustion zones, said regenerating gas being admitted to a lower combustion zone at a pressure greater than that of admission of regenerating gas to the combustion zone thereabove, flowing the gas admitted to each zone through the compact bed of catalyst in such zone; separately withdrawing at the top of each of the respective beds flue gas produced in burning the combustible deposit in the catalyst of the respective beds, the lowermost of said catalyst beds being maintained at a lateral cross-section materially greater than the cross-section of the uppermost of said beds so that the pressure drop per linear unit of height for a given gas volume is lower in said bed of greater lateral cross-section, discharging the flue gas from the lowermost bed at higher pressure than from the bed thereabove, discharging regenerated catalyst from said lowermost bed, and utilizing the flue gas so discharged from the lowermost bed as a gaseous impelling medium for elevation of catalyst in the system to a desired height.

2. The process in accordance with claim 1 wherein said flue gas withdrawn from the lowermost bed is utilized for elevation of freshly regenerated catalyst to a level above a hydrocarbon conversion zone.

3. The process in accordance with claim 1 wherein such flue gas withdrawn from the lowermost bed is utilized for elevation of catalyst without direct compression of the flue gas.

4. A hydrocarbon conversion system comprising a reaction vessel, providing a reaction chamber, a kiln located below said reaction vessel, a narrow communicating conduit connecting said reaction vessel and kiln, adapted to permit the flow of catalyst from said reaction vessel to said kiln, inlet means for introducing hydrocarbon reaction charge into said reaction chamber and outlet means for withdrawing gaseous conversion products from said chamber, a purge gas inlet intermediate said reaction chamber and said kiln; said kiln comprising lateral walls defining an upper regeneration zone and a lower wider regeneration zone, separate inlet means for respectively introducing regeneration gas into said upper regeneration zone and into said lower regeneration zone, means for discharging combustion products proximate the top of said upper regeneration zone, a discharge outlet for combustion products communicating with said lower regeneration zone at a level below the regeneration gas inlet to said upper regeneration zone, a catalyst transfer hopper below said kiln, a communicating conduit connecting said transfer hopper with the bottom of said kiln adapted for passage of catalyst therethrough from said kiln to said hopper, a catalyst lift conduit extending vertically from said hopper to a height above said reaction vessel and terminating within a disengaging vessel, conduit means connecting the bottom of said disengaging vessel and the top of said reaction vessel, said last-named conduit means being adapted for transfer of catalyst therethrough between said disengaging vessel and said reaction vessel, a flue gas supply conduit communicating with said transfer hopper for admission of flue gas to said hopper, said flue gas supply conduit also communicating with the discharge outlet of said lower regeneration zone for continuous flow to said transfer vessel of flue gas discharged from said zone at comparatively high pressure because of the increased width of said zone, said higher pressure being thus available at said comparatively high pressure to operate as lift gas in said transfer vessel in transporting catalyst through said lift conduit.

5. In hydrocarbon conversion processes wherein catalyst is circulated continuously through a system including a reaction zone for catalytic conversion of hydrocarbons in said zone in contact with the catalyst, and then through regeneration zones for combustion of carbonaceous deposit formed in said catalyst in the reaction zone, the catalyst descending in said regeneration zones by gravity to a point of discharge, the improvement which comprises regenerating the catalyst in said regenerating zones in successive combustion stages by counter current passage of independently controlled separate streams of regenerating gas through beds of the descending catalyst in each of said combustion stages, each of said stages of combustion being conducted at superatmospheric pressure, the lateral area of the bed of catalyst being increased in the last combustion stage, thereby reducing the pressure drop through the bed of catalyst in said last stage for a given catalyst volume and thereby providing a corresponding higher average pressure in such last combustion stage, withdrawing from the initial combustion stage flue gas formed in said stage at a low discharge pressure above atmospheric, separately withdrawing flue gas formed in said last combustion stage at a comparatively high discharge pressure, and utilizing only the flue gas from said last combustion stage as a lift gas for transporting the discharged regenerated catalyst to a level above said reaction zone.

6. The process of regenerating solid adsorptive contact mass by burning of combustible deposit therein, which comprises flowing oxygen-containing gas through an upper combustion zone in countercurrent contact with a descending laterally confined compact bed of such contact mass in hot condition in said upper zone, admitting such oxygen-containing gas to said upper zone from an external source at controlled pressure and discharging gaseous combustion products formed in said upper zone at the top of the bed of contact mass in said upper zone, passing hot contact mass from said upper zone by gravity to a lower and separate combustion zone to form a laterally confined descending bed of contact mass in said lower zone of greater cross-sectional area than the bed in said upper zone, separately admitting oxygen-containing gas into said lower combustion zone under independently controlled pressure greater than that at which oxygen-containing gas is admitted to said upper zone, flowing the gas thus admitted in said lower zone upwardly in countercurrent contact with the descending bed of hot contact mass in said zone, disengaging gaseous combustion products from the upper surface of said bed in said lower zone, separately discharging the disengaged gaseous combustion products from said lower zone at a pressure substantially equal to that of admission of the oxygen-containing gas to said upper zone thereby avoiding substantial flow of gas from one to the other of said zones while said lower zone is at a higher average pressure than said upper zone, and discharging the contact mass from said lower zone.

7. The process in accordance with claim 6 including the steps of passing the discharged contact mass from said lower zone to an accumulating zone to form a bed of contact mass therein, maintaining a confined vertical transporting path above said accumulating zone, and admitting under pressure gaseous combustion products from said lower combustion zone to said accumulating zone to effect displacement of contact mass in said accumulating zone and elevation of the displaced mass through said transporting path.

8. In a hydrocarbon conversion system employing granular solid contact mass which is continuously moved in sequence through a reaction zone and through a regeneration zone containing respectively vapor products, the process comprising flowing the contact mass downwardly directly from the reaction zone to the regeneration zone as a confined compact column capable of forming a seal leg between said zones, maintaining at the top of said regeneration zone a gas pressure above atmospheric, maintaining at the bottom of said reaction zone a gas pressure during normal operation in excess of the pressure at the top of said regeneration zone, flowing seal gas downwardly through the confined compact column of contact mass intermediate the bottom of the reaction zone and the top of the regeneration zone to prevent flow of vapors from said reaction zone to said regeneration zone, regenerating the contact mass in said regenerating zone in successive combustion stages by counter current passage of independently controlled separate streams of regenerating gas through beds of the descending contact mass in each of said combustion stages, the lateral area of the bed of contact mass being increased in the last combustion stage, thereby reducing the pressure drop through the bed of contact mass in said last stage for a given volume of said mass and thereby providing a corresponding higher average pressure in such last combustion stage, withdrawing from the initial combustion stage flue gas formed in said stage at a low discharge pressure above atmospheric, separately withdrawing flue gas formed in said last combustion stage at a comparatively high discharge pressure, and utilizing the flue gas from said last combustion stage as a lift gas for transporting discharged regenerated catalyst to a level above said reaction zone, said confined compact column of contact mass between the bottom of said reaction zone and the top of said regeneration zone being of sufficient length to maintain a pressure drop therethrough at least equal to the maximum differential pressure that may be had between the top of the regeneration zone and the bottom of the reaction zone under abnormal conditions when the gas pressure in the bottom of the reaction zone falls below that at the top of said regeneration zone, whereby the required pressure drop can be maintained through said confined column by upward flow of gas therethrough at velocities insufficient to substantially impede downward flow of contact mass in said column, thus permitting uninterrupted circulation of contact mass during such abnormal conditions.

REYNER KOLLGAARD.

REFERENCES CITED

The following references are of record in the file of this patent:

UNITED STATES PATENTS

| Number | Name | Date |
|---|---|---|
| 2,351,214 | Kaufmann et al. | June 13, 1944 |
| 2,411,996 | Kassel | Dec. 3, 1946 |
| 2,414,373 | Gerhold | Jan. 14, 1947 |
| 2,440,475 | Jacomini | Apr. 27, 1948 |
| 2,458,359 | Evans | Jan. 4, 1949 |
| 2,458,487 | Crowley, Jr. | Jan. 4, 1949 |
| 2,471,398 | Simpson et al. | May 24, 1949 |